M. H. FARLEY.
WEIGHING MACHINE.
APPLICATION FILED AUG. 11, 1915.
1,204,965.
Patented Nov. 14, 1916.
2 SHEETS—SHEET 1.
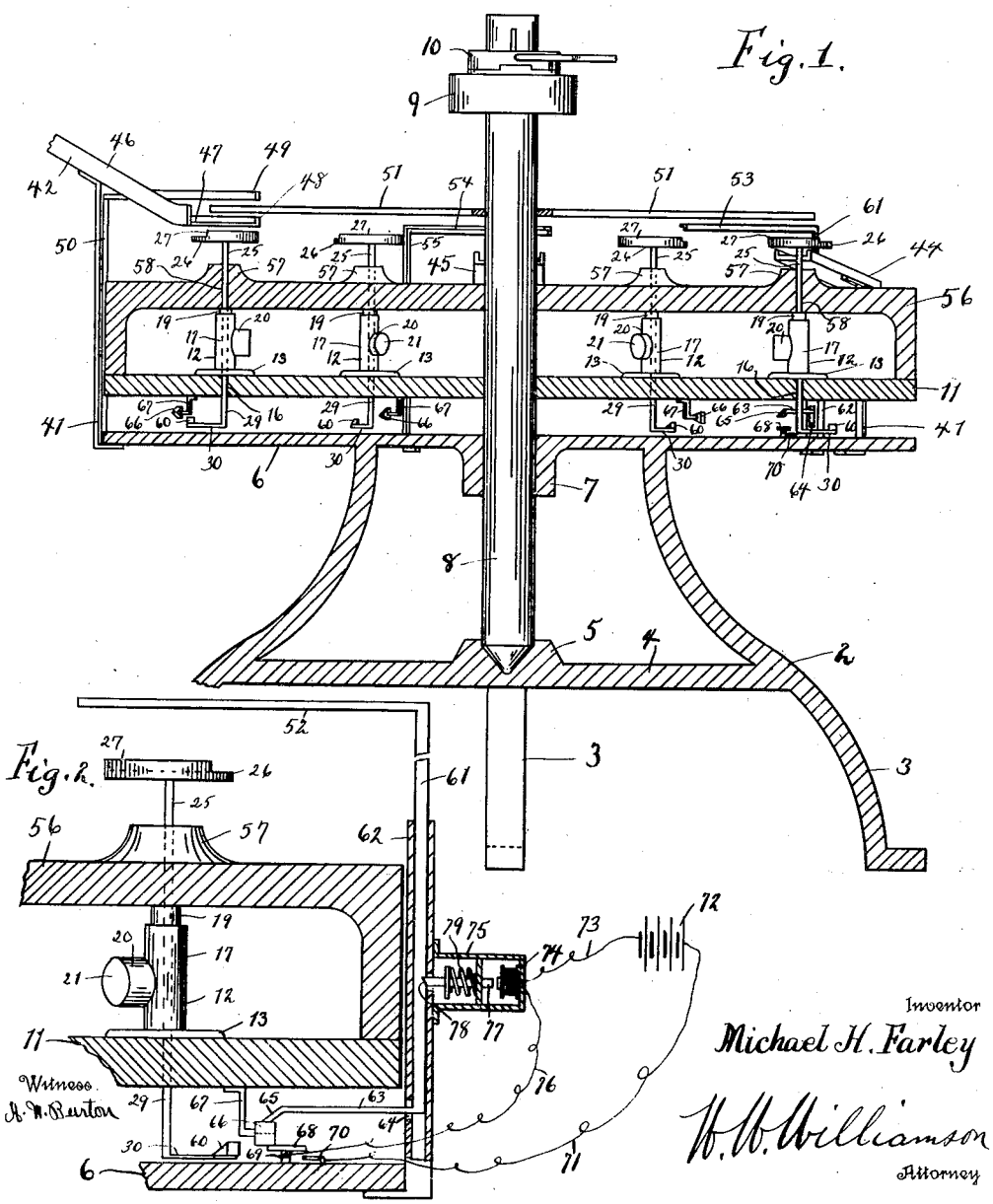

M. H. FARLEY.
WEIGHING MACHINE.
APPLICATION FILED AUG. 11, 1915.

1,204,965.

Patented Nov. 14, 1916.
2 SHEETS—SHEET 2.

Witness
H. W. Burton

Inventor
Michael H. Farley
W. W. Williamson
Attorney

UNITED STATES PATENT OFFICE.

MICHAEL H. FARLEY, OF SEATTLE, WASHINGTON.

WEIGHING-MACHINE.

1,204,965.   Specification of Letters Patent.   Patented Nov. 14, 1916.

Application filed August 11, 1915. Serial No. 44,900.

*To all whom it may concern:*

Be it known that I, MICHAEL H. FARLEY, a citizen of the United States, residing at Seattle, in King county and State of Washington, have invented new and useful Improvements in Weighing-Machines, of which the following is a specification.

My invention relates to new and useful improvements in weighing machines, and has for its object to provide an exceedingly simple, and effective device of this character, whereby filled packages may be weighed in order to ascertain whether or not they are of the correct weight before being finally closed and shipped, and it is especially adapted for weighing canned goods, although it is equally efficient for weighing other packages, such as bags, cartons and the like.

A further object of the invention is to provide a weighing machine having a plurality of scales, so that a great number of packages may be readily and quickly weighed and conveyed from one point to another, and which will automatically place the packages upon the scales as well as remove them therefrom.

Another object of the invention is to provide a number of chutes situated at different points for the removal of the cans or other packages from the scale, each succeeding chute being in a lower position than the preceding one, so that packages of different weights will be readily conveyed from the scales without the possibility of upsetting or interfering with the movements of the scale.

A still further object of the invention is to provide a number of gages, one at each delivery chute, all but one of which are electrically operated, in order that the weight of the packages may be measured and said packages removed at their respective chutes.

With these ends in view, this invention consists in the details of construction and combination of elements hereinafter set forth, and then specifically designated by the claims.

In order that those skilled in the art to which this invention appertains, may understand how to make and use the same, I will describe its construction in detail, referring by numerals to the accompanying drawings forming a part of this application in which—

Figure 3:
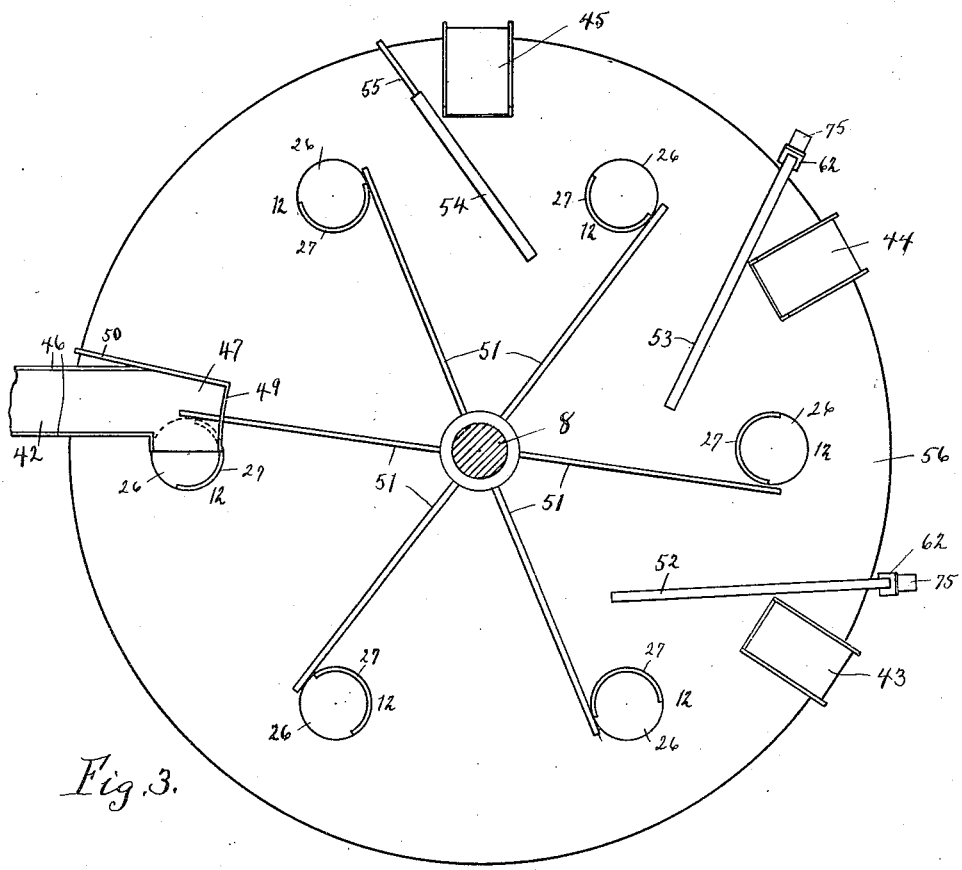
Figure 4:
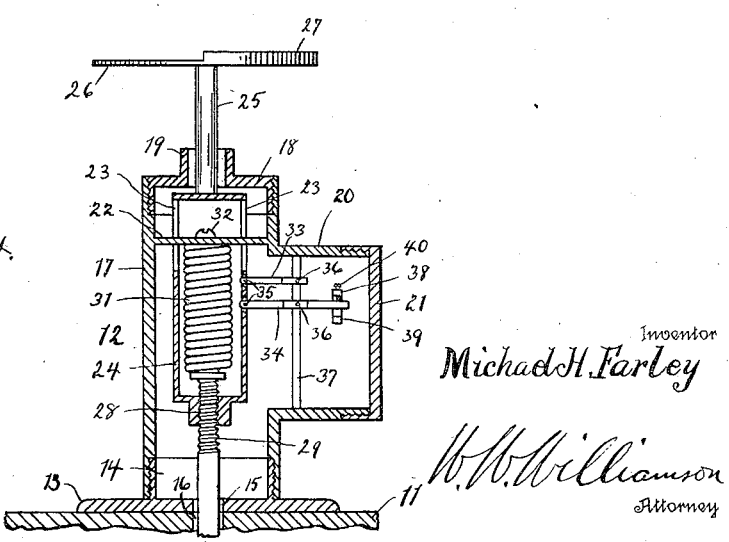

Figure 1, is a vertical sectional view of a weighing machine made in accordance with my improvement. Fig. 2, is an enlarged segmental section showing one of the electrically operated gages. Fig. 3, is a plan view of the weighing machine, a portion of the vertical shaft being broken away; and Fig. 4, is an enlarged detail sectional view of one of the scales.

In carrying out my invention as here embodied 2 represents the stand or frame of the machine having legs 3, a cross piece 4 provided with a bearing 5 and a top plate 6 having a central bearing 7, and in the bearings 5 and 7 is mounted the vertical central shaft 8, said shaft receiving its motion from some source of power through the pulley 9 carrying one member of the clutch 10. On the shaft 8, a suitable distance above the top plate 6 of the frame is mounted a revolving disk 11 adapted to revolve with said shaft and this disk carries a plurality of scales 12. The scales are mounted in a circle upon the revolving disk 11 and spaced apart a suitable distance, and as they are identical in construction, only one will be described in detail. The scale comprises a base 13 having an upstanding externally threaded flange 14 and a central opening 15 adapted to aline with an opening 16 in the revolving disk 11.

On the upstanding flange of the base is mounted the body of the casing 17 having an open upper end into which is threaded the cap 18 having a neck 19. The body 17 has formed at one side and integral therewith an extension or housing 20, the end of which is closed by a cover 21. In the body is situated a cross bar 22, which registers with the slots 23 in the spring housing 24, the upper end of which carries the standard 25 having mounted on its outer end the receiving platform 26, said platform being provided with a peripheral upstanding flange 27 extending part way around its circumference.

The spring housing 24 is provided at its lower end with a threaded opening 28, into which is threaded the rod 29 passing through the openings 15 and 16, and having an arm 30 at right angles thereto, the outer or free end of which is provided with a cam block 60. This rod is swiveled to one end of the helical spring 31 and the opposite end of said spring is secured by a screw 32 or its equivalent to the cross bar 22.

33 and 34 represent a pair of parallel arms, one end of each of which is pivoted as at 35 to the spring housing 24 and are also pivoted as at 36 to the upright bar 37 carried by the extension 20. The arm 34 is of greater length than the arm 33 and projects beyond the upright rod 37 and lies between the lugs 38 and 39, the former having an adjusted screw 40 threaded therein. The downward movement of the platform 26 is regulated by adjusting the screw 40 which will limit the movement of the outer end of the arm 34.

To adjust the height of the scale platform 26 the threaded rod 29 is revolved in the desired direction which will cause the spring housing 24 to thread inward or outward, it being understood that the spring 31 will hold the threaded rod 29 in its normal position, except when some article is being weighed. The upward movement of the scale platform 26 will be regulated by the stop 39, so as to prevent said scale platform being raised to an undue height.

To some stationary part of the machine such as the frame are secured a number of brackets 41 which support the loading chute 42 and the discharging chutes 43, 44 and 45. The chute 43 is adapted to receive packages which are of less weight than required, and the chute 44 is adapted to receive and discharge packages of the correct weight, while the chute 45 is adapted to receive and discharge packages which are greater than the required weight.

The loading chute 42 is provided with flanges 46 in order to properly guide the packages while traveling to the foot 47 of the loading chute, said foot being parallel with the scale platform and having a flange 48 which coöperates with the guard 49 to stop the packages and hold them in their proper positions to be placed upon the scale platforms. The guard 49 is supported by a suitable bracket 50 secured to the frame of the machine, and is spaced from the foot 47 of the chute 42 in order that the propelling arms 51 may pass therebetween to engage the package resting upon the foot of the chute. The propelling arms 51 are secured to the shaft 8 and revolve therewith and are equal in number to the scales carried in the revolving disk and said arms are so situated that they are adjacent the scale platforms and also at the rear thereof. As a scale passes beneath the foot 47 of the loading chute, one of the arms 51 will engage the package or article resting upon said foot and push it from the chute foot on to the scale platform 26 and the flange 27 on said platform will prevent the package from dropping from the platform. After the package has been placed upon the scale platform it is carried around with the revolving of the disk 11 until it reaches one of the gages 52, 53 and 54, each of which is formed from a piece of angle iron planed off on the bottom and sides, the latter being supported by a bracket 55 carried by the frame of the machine.

The gages 52 and 53 are each provided with an upright 61 slidably mounted in a housing 62, secured at its lower end to the frame of the machine, and the lower end of the upright 61 is provided with an extension 63 projecting at right angles from said upright through a slot 64 in the housing 62. The outer end of the extension 63 is provided with a finger 65 situated in the path of travel of the double sided cam 66, carried by an arm 67 depending from the revolving disk, and in the path of travel of said double sided cam is a swinging contact member 68 pivoted to a support 69 carried by the frame of the machine, and this swinging contact member is also in the path of travel of the cam 60. Adjacent the swinging contact member 68 is mounted a stationary contact member 70 which is connected by a wire 71 with a source of electrical energy 72, the latter being connected by a wire 73 with a magnet 74 mounted in the magnet housing 75 carried by the housing 62, and said magnet 74 is connected by a wire 76 with the swinging contact member 68.

In the magnet housing 75 is mounted a sliding bolt or catch 77 which projects into the housing 62 and is arranged to engage the keeper notch 78 formed in the upright 61, and said catch is normally held in contact with the upright by a spring 79. If a package upon a scale is light in weight, the scale will be depressed only a sufficient distance to bring the cam block 60 into contact with the swinging contact member adjacent the gage 52, thereby causing said contact member 68 to be thrown into engagement with the contact member 70, thus energizing the magnet 74 to withdraw the catch 77 against the action of the spring 79 from the keeper notch 78, thereby permitting the gage 52 to fall by gravity into the path of travel of the can upon the scale, and as said can will then be unable to pass beyond the gage 52 it will be guided by said gage to the chute 43 from which point it may be removed and again conveyed to the filler. After the can has been removed from the scale, the double sided cam block 66 following the cam block 60 on the scale which actuates the gage will then engage the swinging contact 68 so as to break the electrical circuit and release the catch 77, the latter being forced outward by its spring.

At the same time the double sided cam block will engage the finger 65 and raise the gage 52 until the nose of the catch 77 engages the keeper notch 78, thus resetting the gage.

If the package upon the scale is light in weight, the cam block 60 will engage and actuate the swinging contact 68, thereby completing an electrical circuit for actuating the catch 77, thus unlocking the gage 52 which will descend into the path of travel of the package and guide the same from the scale platform to the chute 43, but if the package is of the proper weight the scale will be depressed sufficiently for the cam block 60 to pass beneath the swinging contact 68, through which the gage 52 is actuated, but the position of the cam block 60 will be such as to actuate the next succeeding swinging contact 68 or the one controlling the movements of the gage 53. Considering that the package upon the scale is of the proper weight, then the scale has been depressed sufficiently to pass beneath the first swinging contact 68, but will engage the succeeding swinging contact 68 and complete an electrical circuit for actuating the catch 77 of the gage 53, thus unlocking said gage 53 which will descend into the path of travel of the properly weighted package and guide the same from the scale platform to the chute 44. Should the package upon the scale be of greater weight than required, the scale will be depressed sufficiently to permit the cam block 60 to pass beneath both swinging contacts 68, and also permit the package to pass beneath the gages 52 and 53, but the stationary gage 54 which is low enough to be in the path of travel of the heaviest or all packages passing the other gages will guide such packages from the scales to the chute 45. It is unnecessary that the scale have any great movement, as the can or other packages are filled by measurement and are generally close to the required weight, so that the chutes 43, 44 and 45 might all be the same height, but if a scale is used which has considerable movement it is desirable to have said chutes of different heights, the chute 43 being the highest and the chute 45 the lowest.

In order to prevent any of the contents of the cans or packages from reaching the revolving disk 11 and the mechanism of the scales I provide a casing cover 56 which sets upon the revolving disk and incloses the scale mechanism. On the upper face of the casing cover are formed a number of bosses 57 through which pass the openings 58 in said casing cover, said openings having the standard 25 of the scales situated therein. By placing the bosses upon the casing cover, if any of the contents of the package spill upon the casing cover, and especially if said contents are in the form of a liquid, they will be prevented from reaching the openings 58 and therefore cannot enter the scale mechanism which would clog up the latter and prevent them from working properly.

The operation of the device is as follows: If canned goods are being packed, the cans are filled with their contents and placed upon the loading chute 42 along which they move to the foot 47, where the can resting upon said foot is removed therefrom by one of the arms 51, and caused to rest upon the scale platform passing beneath said foot, from which point the can is carried around upon the scale, and if light in weight, the gage 52 will be lowered to engage the can, and remove the same from the scale platform on to the chute 43, and if said can is of the proper weight, the gage 52 will not be lowered and the can will pass beneath it, but said can will engage the gage 53 and be removed from the scale platform. If the can is heavier than desired, it will pass beneath both gages 52 and 53, but will be engaged by gage 54 which will guide the can to the chute 45 as before described. The number of scales used and the speed at which the revolving disk may be revolved will permit a great number of packages to be quickly weighed and distributed.

Of course I do not wish to be limited to the exact details of construction as herein shown, as these may be varied within the limits of the appended claims without departing from the spirit of my invention.

Having thus fully described my invention, what I claim as new and useful, is—

1. In a device of the character stated a frame, a shaft journaled therein, a revolving disk carried by said shaft, a plurality of scales mounted on said disk, a loading chute, a plurality of discharge chutes situated at different points around the circumference of the revolving disk, a stationary gage adjacent one of the discharge chutes for removing packages of a predetermined weight from the scales, a second movable gage for removing packages of a different weight from the scales, said movable gage comprising a gage arm, an upright provided with a keeper notch, a housing in which the upright is slidably mounted, an extension projecting from the lower end of the upright beyond the housing, a finger carried by said extension, a contact member, a swinging contact member adapted to coact with the first named contact member, a catch spring actuated in one direction, whereby the same is caused to register with the keeper notch, an electro-magnet for operating said catch in the opposite direction, an electric circuit including said magnet and contacts, a cam block carried by a movable part of the scales for actuating the swinging contact to lower said movable gage, and a double faced cam block depending from the revolving disk adapted to engage the movable gage extensions for raising the gage, and also adapted to engage the swinging contact for breaking the electrical circuit.

2. In a device of the character stated a frame, a shaft journaled therein, a revolving disk carried by said shaft, a plurality of scales mounted on said disk, a loading chute, a plurality of discharge chutes situated at different points around the circumference of the revolving disk, a stationary gage adjacent one of the discharge chutes for removing packages of a predetermined weight from the scales, a movable gage for removing packages of a different weight from the scales, electrically operated means for holding said movable gage in a normal position, means carried by the scales to cause the electrically operated means to release the movable gage if the means carried by the scales are properly positioned because of the weight of the packages upon the scales, and means carried by the revolving disk for resetting the movable gage and electrically operated holding means.

In testimony whereof, I have hereunto affixed my signature in the presence of two subscribing witnesses.

MICHAEL H. FARLEY.

Witnesses:
 FRANK J. DOYLE,
 GEO. E. BANKS.